United States Patent
Stoliartchouk et al.

(10) Patent No.: US 11,010,795 B2
(45) Date of Patent: May 18, 2021

(54) SYSTEM AND METHOD FOR AFFILIATE LINK GENERATION

(75) Inventors: Alexei Stoliartchouk, Kensington, CA (US); Forrest Jordan, Dallas, TX (US); Baxter Box, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 952 days.

(21) Appl. No.: 13/547,771

(22) Filed: Jul. 12, 2012

(65) Prior Publication Data

US 2013/0262971 A1    Oct. 3, 2013

Related U.S. Application Data

(60) Provisional application No. 61/617,857, filed on Mar. 30, 2012.

(51) Int. Cl.
*G06F 17/00* (2019.01)
*G06Q 30/02* (2012.01)

(52) U.S. Cl.
CPC ......... *G06Q 30/0277* (2013.01); *G06Q 30/02* (2013.01)

(58) Field of Classification Search
CPC .... G06F 17/24; G06F 17/3089; G06F 40/134; G06Q 30/06; G06Q 30/02
USPC ...................... 715/208, 234; 705/14.1, 14.16
See application file for complete search history.

(56) References Cited

U.S. PATENT DOCUMENTS

| | | |
|---|---|---|
| 5,812,769 A | 9/1998 | Graber et al. |
| 6,029,141 A | 2/2000 | Bezos et al. |
| 6,141,666 A | 10/2000 | Tobin |
| 6,334,111 B1 | 12/2001 | Carrott |
| 6,615,238 B1 | 9/2003 | Melet et al. |

(Continued)

FOREIGN PATENT DOCUMENTS

| | | |
|---|---|---|
| WO | 2007021974 A | 2/2007 |
| WO | 2008002335 A1 | 1/2008 |

(Continued)

OTHER PUBLICATIONS

International Search Report for corresponding application PCT/US2013/034151 dated Oct. 1, 2013.

(Continued)

*Primary Examiner* — Stephen S Hong
*Assistant Examiner* — Matthew J Ludwig
(74) *Attorney, Agent, or Firm* — Bookoff McAndrews, PLLC

(57) ABSTRACT

A method and system is provided for facilitating affiliate link generation. A user enables the system by identifying a webpage on an affiliate web site. The system performs an initial assessment of the page to extract webpage information, which is compared to information stored in a database. If the extracted information matches stored information, a record of the webpage is displayed and an affiliate link is dynamically generated for immediate use. If the extracted information does not match stored information, a new record of the webpage is created. If the webpage contains product-specific data, a product-specific record is stored. If the webpage does not contain product-specific data, a non-product record is stored. An affiliate link is then dynamically created. The new record of the product and dynamically created affiliate link is added to the database for immediate use.

20 Claims, 2 Drawing Sheets

(56) References Cited

U.S. PATENT DOCUMENTS

| | | |
|---|---|---|
| 6,629,135 B1 | 9/2003 | Ross et al. |
| 7,032,168 B1 | 4/2006 | Gerace et al. |
| 7,359,869 B1 | 4/2008 | Ananda |
| 7,480,627 B1 | 1/2009 | Van Horn et al. |
| 7,617,122 B2 | 11/2009 | Kumar et al. |
| 8,285,598 B2 | 10/2012 | Mesaros |
| 8,515,825 B1* | 8/2013 | Ross, Jr. ................ G06Q 30/06 705/14.6 |
| 2001/0020231 A1* | 9/2001 | Perri, III ................ G06Q 30/02 705/14.16 |
| 2002/0184095 A1 | 12/2002 | Scullard et al. |
| 2003/0023687 A1* | 1/2003 | Wolfe ........................ 709/206 |
| 2004/0044565 A1 | 3/2004 | Kumar et al. |
| 2005/0065806 A1 | 3/2005 | Harik |
| 2007/0088713 A1 | 4/2007 | Baxter et al. |
| 2007/0288312 A1 | 12/2007 | Wang |
| 2008/0065476 A1 | 3/2008 | Klein et al. |
| 2008/0133365 A1 | 6/2008 | Sprecher et al. |
| 2008/0208682 A1 | 8/2008 | Chandley et al. |
| 2008/0281688 A1* | 11/2008 | Kluth ........................ 705/14 |
| 2009/0018917 A1 | 1/2009 | Chapman et al. |
| 2009/0254838 A1 | 10/2009 | Rao et al. |
| 2009/0281893 A1 | 11/2009 | Muhonen et al. |
| 2010/0010887 A1 | 1/2010 | Karlin et al. |
| 2010/0058160 A1* | 3/2010 | Navarro ............. G06Q 10/0637 715/208 |
| 2010/0082360 A1 | 4/2010 | Chien et al. |
| 2011/0082730 A1 | 4/2011 | Karlin et al. |
| 2011/0106628 A1 | 5/2011 | Nam et al. |
| 2012/0005024 A1 | 1/2012 | Fernandez Gutierrez |
| 2012/0245976 A1 | 9/2012 | Kumar et al. |
| 2012/0253918 A1 | 10/2012 | Marois et al. |
| 2012/0303425 A1* | 11/2012 | Katzin ................ G06Q 20/027 705/14.4 |
| 2012/0323666 A1 | 12/2012 | King |
| 2013/0110585 A1* | 5/2013 | Nesbitt ................ G06Q 30/02 705/7.35 |
| 2013/0151416 A1 | 6/2013 | Ng et al. |
| 2013/0204701 A1 | 8/2013 | Calafiore et al. |
| 2013/0268367 A1 | 10/2013 | Erdogan |

FOREIGN PATENT DOCUMENTS

| | | |
|---|---|---|
| WO | 2009006606 A1 | 1/2009 |
| WO | 2009045405 A1 | 4/2009 |
| WO | 2009126941 A1 | 10/2009 |
| WO | 2010090783 A2 | 8/2010 |
| WO | 2011121455 A2 | 10/2011 |
| WO | 2013148356 A1 | 10/2013 |
| WO | 2013150479 A2 | 10/2013 |

OTHER PUBLICATIONS

Written Opinion of the International Searching Authority for corresponding application PCT/US2013/034151 dated Oct. 1, 2013.

The International Preliminary Report on Patentability issued by USPTO dated Mar. 17, 2016 for PCT Application No. PCT/US2015/019212.

The Reply in response to the Communication dated Mar. 8, 2016 as filed in the European Patent Office on Sep. 16, 2016 for co-pending European patent application No. 13717619.4.

The Reply in response to the Communication dated Feb. 9, 2017 as filed with the European Patent Office on May 15, 2017 for co-pending European patent application No. 13717619.4.

The Reply in response to the Communication dated Dec. 2, 2016 as filed with the European Patent Office on Jun. 8, 2017 for corresponding European patent application No. 15713059.2.

The Communication dated Feb. 9, 2017 issued by the European Patent Office for co-pending European patent application No. 13717619.4.

\* cited by examiner

SYSTEM AND METHOD FOR AFFILIATE LINK GENERATION

CROSS REFERENCE TO RELATED APPLICATIONS

The present application claims the benefit under 35 U.S.C. § 119(e) of U.S. Provisional Patent Application Ser. No. 61/617,857 filed Mar. 30, 2012 and entitled "System and Method for Affiliate Link Generation," which is incorporated herein by reference for all purposes.

TECHNICAL FIELD

The present disclosure relates generally to electronic commerce, and in particular, to an affiliate link generation system.

BACKGROUND

With the rapid evolution of technology in recent years, there has been a growing trend toward on-line publishing, by businesses, such as on-line magazine publishers, as well as by individuals, such as personal bloggers. These on-line publishers frequently review and publish commentary on a variety of products on their web site. Accordingly, on-line marketing has evolved to include awarding commission to web site operators on sales made to consumers who have arrived at an affiliate's web site through a tracked link on the web site operator's web site.

Typically, web site operators are limited to earning commissions on products supported by a particular external affiliate network for which they can obtain an existing affiliate link. Moreover, these affiliate networks require the use of certain technology, which excludes users not employing the requisite technology.

SUMMARY

Embodiments of the present disclosure generally facilitate the creation of affiliate links directly from any page on a web site of a supported advertiser, including product and non-product pages (the "Webpage"), using a cross-advertiser and cross-browser compatibility and technology system, which allows web site operators to easily find and monetize their content.

According to one embodiment of the present disclosure, a computer system is configured for integrating affiliate networks to provide or dynamically create affiliate links on one platform to be used across all affiliate network platforms on all browsers.

In one embodiment, a user navigates to an individual Webpage and enables the system activator bookmark, which will display a record of the Webpage, including a product picture, product name, and price. The system will then dynamically generate an affiliate link. The affiliate link can be immediately used on the user's web site or other social media outlets, and tracked for analytics and cost per acquisition (CPA) conversion purposes.

If a record of the Webpage is not found, the system will scrape the Webpage to ascertain product information and create a new record of the Webpage using the product information. The system will then dynamically generate an affiliate link. If the system cannot ascertain product information from the scrape, the system will dynamically generate an affiliate link to the Webpage. The system will create a new record of the Webpage using general Webpage information, rather than information related to specific product information. The affiliate link can be immediately used on the user's web site or other social media outlets, and tracked for analytics and cost per acquisition (CPA) conversion purposes.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides a system and method of generating affiliate links. More particularly, the present disclosure provides a system and method of aggregating and integrating affiliate links from external affiliate network databases, as well as dynamically generating links for affiliate Webpages not located in existing external affiliate network databases.

Figure 1:
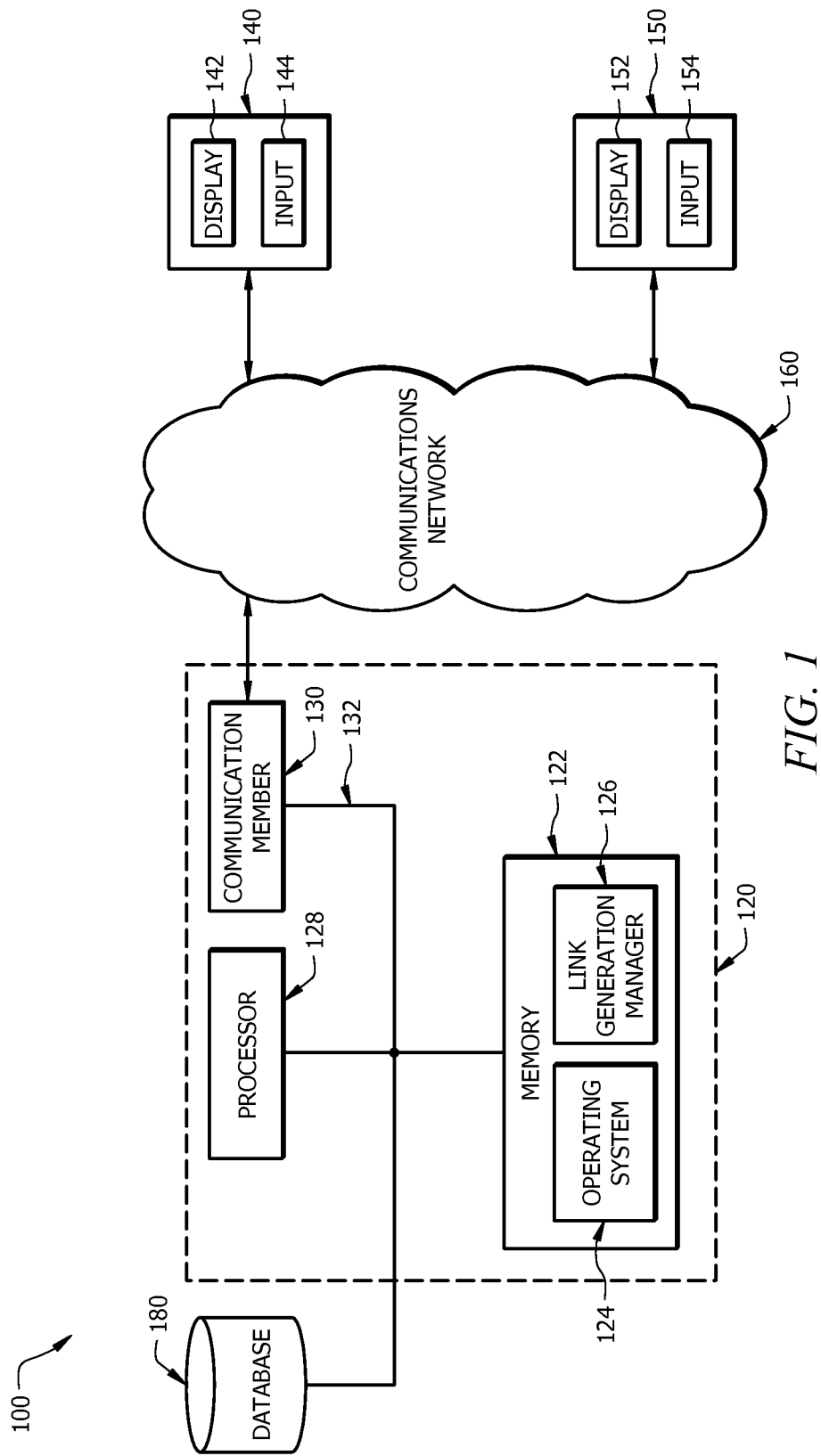
FIG. 1 is a block diagram of a computer environment for implementing an affiliate link generation system in accordance with one embodiment of the present disclosure.

FIG. 1 generally illustrates an affiliate link generation system 100 according to one embodiment of the present disclosure. It should be understood that system 100 shown in FIG. 1 is for illustrative purposes only and that any other suitable system or subsystem could be used in conjunction with or in lieu of system 100 according to one embodiment of the present disclosure.

System 100 allows an on-line publisher 140 to communicate and interact with link generation server 120 through a communications network 160.

Link generation server 120 may generally include a computer system having a memory 122, at least one processor 128, and a communication member 130. Each element of the link generation server 120 is coupled to bus 132 or other communication mechanism for relaying information.

Memory 122 comprises both random access memory (RAM) and read-only memory (ROM). Memory 122 may be employed to store program information, instructions to be executed by processor 128, and temporary information during execution of instructions by processor 128.

Within memory 122 reside operating system 124 and link generation manager 126. Operating system 124 may be employed as a software platform upon which the affiliate link generation application programs may execute. Link generation manager 126 may generally include program instruction sequences for generating affiliate links for affiliate Webpages.

Processor 128 may be employed to execute the program instructions that are stored by memory 122. Processor 128 is capable of identifying and monitoring each on-line publisher 140 as well as communicating with each on-line publisher 140 via communications member 130 and communications network 160.

Communication member 130 comprises conventional hardware and software that facilitates coupling link generation server 120 to communications network 160.

In an embodiment, link generation server 120 is coupled to a database 180. Link generation server 120 may store information associated with affiliate Webpages in the database 180. Affiliate Webpage information stored in database 180 may be derived from affiliate sources, external affiliate network sources, other suitable sources, or any combination thereof. Information stored in database 180 may include affiliate product web pages, affiliate non-product web pages, product commissions, affiliate links if available, product descriptions, product options, product prices, and product pictures, or any other suitable affiliate Webpage information. Link generation server 120 may also store information corresponding to each on-line publisher 140, such as names, addresses, phone numbers, commission account information, or any other suitable on-line publisher information, in the database 180.

On-line publishers 140 obtain affiliate links generated by link generation server 120 by communicating with link generation server 120 through communications network 160. On-line publishers 140 may be located in any geographical location.

Each on-line publisher 140 may generally include at least one display 142, to view affiliate Webpages and associated information, and at least one input device 144, to communicate with link generation server 120.

Link generation server 120 may also communicate link generation information to interested parties 150. Link generation information may include the Webpage, product name, product web page and on-line publisher information. Interested parties 150 may include affiliates, representatives of affiliates, marketing consultants, external affiliate networks, other parties interested in link generation data, or any combination thereof.

Each interested party 150 may generally include at least one display 152, to view link generation data, and at least one input device 154, to communicate with link generation server 120.

Any of displays 142 and/or displays 152 may be a mobile phone screen, liquid crystal display (LCD), light emitting diode screen (LED), plasma screen, cathode ray tube (CRT) monitor, high definition television (HDTV) screen, conventional television screen, projection television screen, video conferencing display, other suitable display, or any combination thereof.

Any of input devices 144 and/or input devices 154 may be an alphanumeric keyboard, mouse, trackball, cursor direction keys, touch pad, Touch Tone telephone, wireless telephone, two-way pager, personal digital assistant, voice recognition device, other suitable data input device, or any combination thereof.

The present disclosure is related to the use of link generation server 120 to dynamically generate affiliate links, as described herein. According to one embodiment of the present disclosure, execution of the instructions stored in memory 122 allows processor 128 to implement the functionality described above.

In one embodiment, the core technology used is HTML, CSS, JavaScript on the client facing components of the tool and PHP, Apache, MySQL on the server side. The client part also employs third party JavaScript libraries such as JQuery and easyXDM. The server part also relies on database 180 with records of products provided by affiliate networks. By way of example but not limitation, current third party affiliate networks include Commission Junction, Linkshare, PepperJam, Google Affiliate Network, and various others.

In alternative embodiments, hardware circuitry may be used in conjunction with or in lieu of software instructions to implement the present disclosure. However, the present disclosure is not limited to any specific combination of hardware circuitry and/or software.

Figure 2:
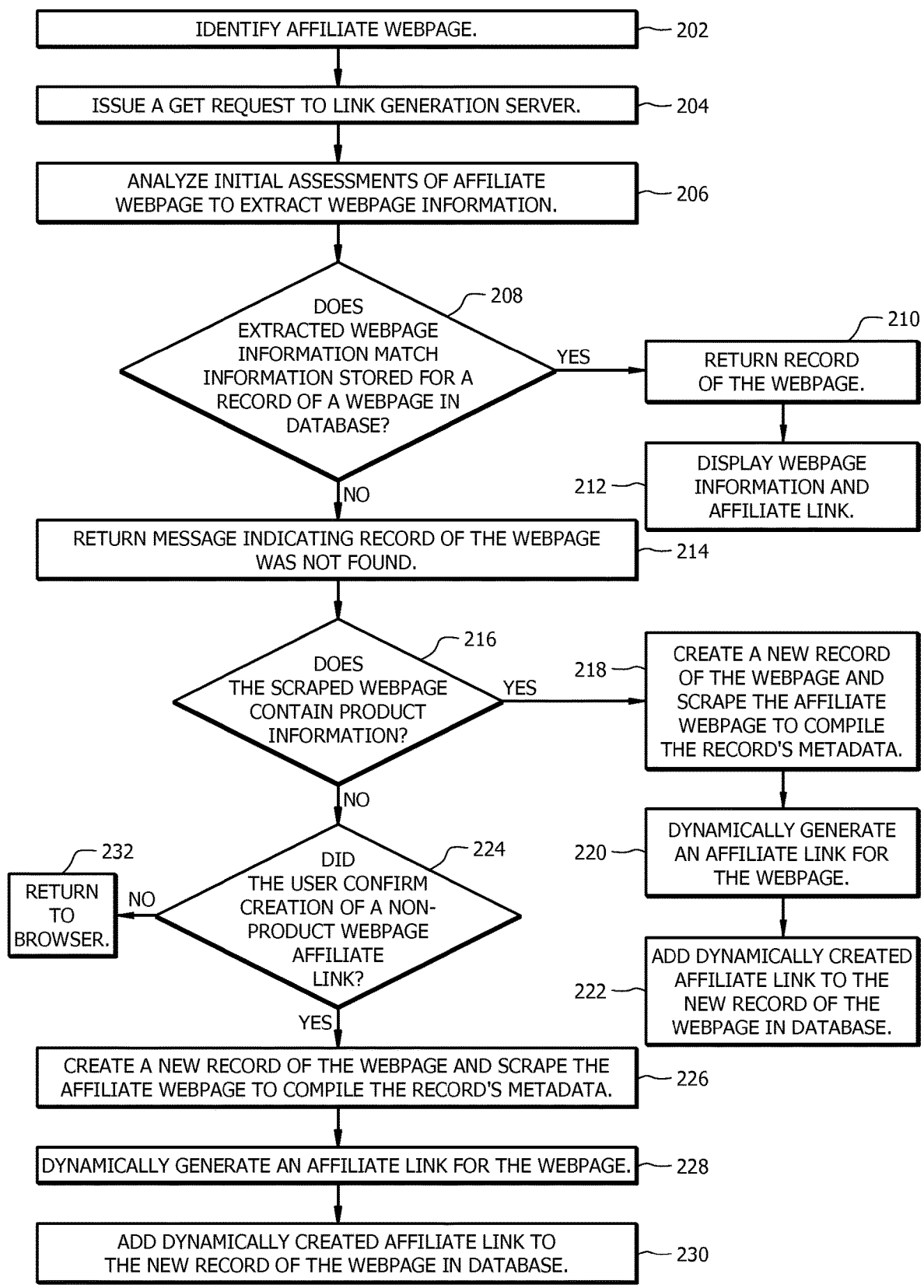
FIG. 2 is a somewhat simplified flow diagram illustrating a method of generating an affiliate link in accordance with one embodiment of the present disclosure.

FIG. 2 is a somewhat simplified flow diagram illustrating method 200 of generating affiliate links according to one embodiment of the present disclosure. It should be understood that method 200 shown in FIG. 2 is for illustrative purposes only and that any other suitable method or sub-method could be used in conjunction with or in lieu of method 200 according to one embodiment of the present disclosure. It should also be understood that the steps of method 200 could be performed in any suitable order or manner.

In an embodiment, method 200 begins in step 202 with a user identifying an affiliate Webpage to integrate into the user's web post using on-line publisher 140 by clicking a system activator bookmark from a bookmark bar in the on-line publisher 140 that executes an initialization JavaScript.

The on-line publisher 140 may then communicate the information to link generation server 120 by issuing a GET request through communications network 160 using Bluetooth, Wi-Fi, infrared, text message, email, bump technology or by any other suitable manner, as shown in step 204.

Link generation manager 126 analyzes initial assessments of the affiliate Webpage to extract Webpage information, as shown in step 206.

In step 208, link generation manager 126 determines if the extracted Webpage information in step 206 matches Webpage information stored in database 180.

If link generation manager 126 determines the extracted Webpage information matches Webpage information stored in database 180, the link generation server 120 will return the record of the Webpage to on-line publisher 140, as shown in step 210. If the Webpage information stored in database 180 contains product information, link generation server 120 will either display the product picture through display 142 or prompt the user to input a product picture through input 144.

In one embodiment, the product picture is displayed as a result of parsing the parent HTML document and finding an image.

Link generation server 120 will then create a loader inline frame ("iframe") that will create a final iframe containing the Webpage information and the affiliate link. Link generation server 120 will communicate the Webpage information and affiliate link to on-line publisher 140, as shown in step 212.

Frames allow a visual HTML Browser window to be split into segments, each of which may show a different document. An iframe places another HTML document in a frame inside the original parent document. Unlike an object element, an inline frame can be the "target" frame for links defined by other elements and it can be selected by the user agent as the focus for printing, viewing its source.

In one embodiment, communication between the JavaScript attached to the parent page and the iframe is implemented with the use of easyXDM. EasyXDM is a JavaScript library that enables a system to easily work around the limitation set in place by the Same Origin Policy, in turn making it easy to communicate and expose the JavaScript Application Programming Interface (API) across domain boundaries. EasyXDM provides a transport stack capable of passing string-based messages between the consumer and the provider. The transport stack offers bi-directionality, reliability, queuing and sender-verification and does not violate browser security policy since the connection is only established once and only simple plain text messages can be sent across the frames. The one-time connection setup is enforced by easyXDM library to lock the connection down to avoid spoofing attacks.

If link generation manager 126 determines the extracted Webpage information does not match Webpage information stored in database 180, the link generation server 120 will return a message indicating the Webpage was not found through display 142, as shown in step 214.

In step 216, link generation server 120 will scrape the Webpage to determine if product information may be ascertained.

If link generation server 120 ascertains product information from the scraped Webpage, link generation server 120 will create a new record of the product and compile the record's metadata from the scraped Webpage, as shown in step 218.

In step 220, link generation server 120 will dynamically create an affiliate link for the Webpage. In one exemplary embodiment, the affiliate link can be unique to the user.

In step 222, the new record of the Webpage and affiliate link dynamically created in step 220 will be added to database 180 for use by a plurality of on-line publishers 140.

If link generation server 120 ascertains that product information cannot be scraped from the Webpage, link generation server 120 will prompt the user to confirm creation of a non-product Webpage affiliate link, as shown in step 224.

If the user confirms creation of a non-product page affiliate link, link generation server 120 will create a new record of the Webpage and compile the record's metadata from the scraped non-product Webpage, as shown in step 226.

In step 228, link generation server 120 will dynamically create an affiliate link for the Webpage.

In step 230, the new record of the Webpage and affiliate link dynamically created in step 220 will be added to database 180 for use by a plurality of on-line publishers 140.

If the user does not confirm creation of a non-product page affiliate link, link generation server 120 will return the user to the browser screen, as shown in step 232.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for dynamically generating affiliate links over the Internet via a facilitator, the method comprising the steps of:

receiving, from a user, a request to generate an affiliate link for an affiliate webpage;

extracting webpage information of the affiliate webpage;

assessing the affiliate webpage to determine whether the webpage information other than a uniform resource locator matches content stored in a database and if determined the information extracted does not match scraping and extracting information from the affiliate webpage other than the uniform resource locator of the webpage;

dynamically creating a record of the affiliate webpage;

compiling the record's metadata from the information scraped and extracted;

creating a new affiliate link for the affiliate webpage, wherein the new affiliate link is associated with the user; and displaying the new affiliate link to the user.

2. The method of claim 1, wherein the user requests an affiliate link by engaging a system activator bookmark, when the user is on the affiliate webpage, which initiates execution of an initialization JavaScript.

3. The method of claim 1, further comprising the step of receiving, from an affiliate, content separate from a uniform resource locator from a plurality of webpages and storing the webpage content in a database separate from the uniform resource locator.

4. The method of claim 3, further comprising the step of analyzing queried webpage content separate from the uniform resource locator against the webpage content stored in the database separate from the uniform resource locator.

5. The method of claim 4, further comprising the step of, if the queried webpage content is not in the database separate from the uniform resource locator, storing the extracted queried webpage content in the database separate from the uniform resource locator.

6. The method of claim 1, further comprising the step of recording the affiliate link as unique to the user in the database by storing information corresponding to the user.

7. The method of claim 1, further comprising the step of transmitting to the affiliate an affiliate link unique to the user including commission account information that is stored in a data record with the affiliate link.

8. The method of claim 1, wherein receiving, from the user, the request to generate the affiliate link for the affiliate webpage comprises receiving, from a publishing tool of an online publisher, the request to generate the affiliate link for the affiliate webpage and to insert the affiliate link in an online post being generated by the publishing tool.

9. The method of claim 1 further comprising:

determining whether the scraped and extracted queried webpage content relates to a product; and generating a user query to confirm generation of a non-product webpage affiliate link if it is determined that the scraped and extracted queried webpage content does not relate to a product.

10. The method of claim 1, wherein the affiliate is comprised of one or more advertisers.

11. The method of claim 1, wherein the method facilitates affiliate link generation for a plurality of browsers and technology systems.

12. A method for dynamically generating affiliate links over the Internet via a facilitator, the method comprising the steps of:

receiving, from an affiliate, webpage content for a plurality of webpages and storing the webpage content in a database separate from uniform resource locator data;

receiving, from a user, a request to generate an affiliate link for an affiliate webpage;

assessing the affiliate webpage to determine whether content from the affiliate webpage matches the webpage content stored in the database separate from the uniform resource locator data;

upon determining that the content from the affiliate webpage matches the webpage content stored in the database separate from the uniform resource locator data;

displaying the content from the affiliate webpage stored in the database to the user and generating the affiliate link, wherein the affiliate link is associated with the user;

upon determining that the content from the affiliate webpage does not match the webpage content stored in the database separate from the uniform resource locator data;

displaying extracted queried webpage content stored in the database separate from uniform resource locator data to the user, presenting a query to the user to confirm the request to generate the affiliate link, and generating the affiliate link upon the user confirming the request to generate the affiliate link, wherein the affiliate link is associated with the user; and displaying the affiliate link to the user.

13. The method of claim 12, wherein the user requests an affiliate link by engaging a system activator bookmark, when the user is on the affiliate webpage, which initiates execution of an initialization JavaScript.

14. The method of claim 12, further comprising the steps of:

recording the affiliate link as unique to the user in the database;

dynamically creating a record of the affiliate webpage; and compiling metadata of the record from the extracted queried webpage content.

15. The method of claim 12, further comprising the step of transmitting to the affiliate the affiliate link associated with a social media account of the user.

16. The method of claim 12, further comprising the step of, upon determining that the extracted queried webpage content separate from the uniform resource locator data is not in the database, storing the extracted queried webpage content separate from the uniform resource locator data in the database.

17. The method of claim 12, wherein the webpage content comprises product descriptions and product pictures.

18. The method of claim 12, wherein one or more of the webpage content and the extracted queried webpage content is comprised of at least one of an affiliate product webpage, an affiliate non-product webpage, a product commission, a product description, a product option, a product price, or a product picture.

19. The method of claim 12, wherein the affiliate is comprised of one or more advertisers.

20. The method of claim 12, wherein the method facilitates affiliate link generation for a plurality of browsers and technology systems.

* * * * *

UNITED STATES PATENT AND TRADEMARK OFFICE
CERTIFICATE OF CORRECTION

PATENT NO. : 11,010,795 B2  
APPLICATION NO. : 13/547771  
DATED : May 18, 2021  
INVENTOR(S) : Alexei Stoliartchouk et al.

Page 1 of 1

It is certified that error appears in the above-identified patent and that said Letters Patent is hereby corrected as shown below:

In the Claims

In Claim 12, Column 7, Line 10:
Delete "data;" and insert --data:--.

In Claim 12, Column 7, Line 19:
Delete "data;" and insert --data:--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*